C. Jillson,
Glass Mold.
N° 79,660.  Patented July 7, 1868.
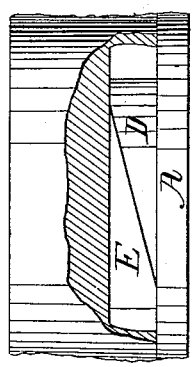
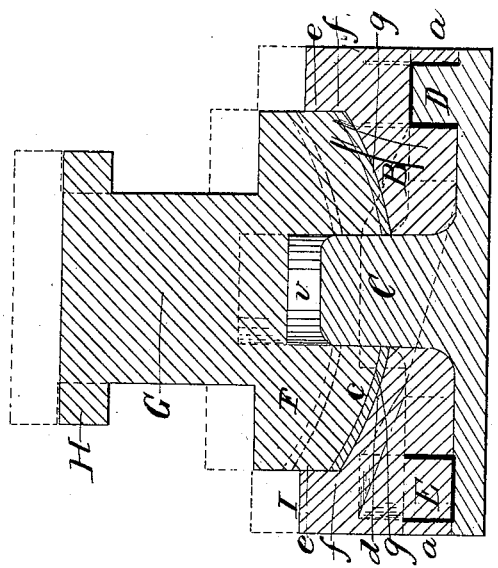
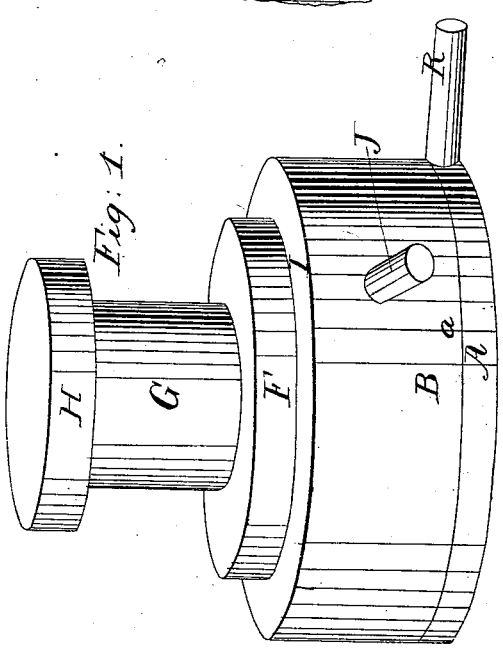
Witnesses;
Thos. H. Dodge
D. S. Miller.
Inventor;
C. Jillson

United States Patent Office.

CLARK JILLSON, OF WORCESTER, MASSACHUSETTS.

Letters Patent No. 79,660, dated July 7, 1868.

IMPROVED MOULDS FOR MAKING STRAWBERRY-RIPENERS.

The Schedule referred to in these Letters Patent and making part of the same.

KNOW ALL MEN BY THESE PRESENTS:

That I, CLARK JILLSON, of the city and county of Worcester, and Commonwealth of Massachusetts, have invented certain new and useful Improvements in Moulds for Making Strawberry-Ripeners; and I do hereby declare that the following is a full, clear, and exact description of the same, reference being had to the accompanying drawings, forming a part of this specification, in which—

Figure 1 represents a perspective view of my improved mould.

Figure 2 represents a vertical central section, and

Figure 3 represents a side view of a part of the mould, a portion of the outer shell being broken away, to show the elevating-cams.

To enable those skilled in the art to which my invention belongs to make and use the same, I will proceed to describe it more in detail.

In the drawings, A represents the base upon which the lower part, B, of the mould rests. A central stem, C, extends up from the part A, while a series of cams, D, is arranged upon its upper side, and near the periphery thereof, as indicated in the drawings.

The lower part, B, of the mould is provided with a series of cams, E, to correspond in shape with the cams D.

A flange, a, projects down upon the outside of the cam, E, as shown in fig. 2, whereby, when the parts A and B are arranged and placed together, as shown in fig. 1, flange a rests upon the outer edge of the base, A, thereby covering and protecting both series of cams E and D, (see fig. 1.)

The stem C projects through a hole in the lower part, B, of the mould, and also into a recess or hole, b, on the piston, F, the face, c, of which is made convex, to fit the concave surface, d, of the part B, its vertical sides e fitting the vertical sides f of the part B, as fully indicated in fig. 2 of the drawings.

The neck G, of the piston F, is provided with a flange, H, which may be provided with holes, for the purpose of fastening the same to an elevating and depressing-rod or arm.

The operation is as follows: The piston F being elevated so as to clear the upper face I, of the part B, a sufficient quantity of molten glass to form one of my strawberry-ripeners, for which Letters Patent have been granted to me, is placed in the matrix, or concaved part, d, of the part B, when piston F is depressed, thereby pressing the glass, g, evenly around the stem C, and over the entire concave surface d, and slightly up the vertical sides f of the part B, as fully indicated in fig. 2 of the accompanying drawings.

As soon as the glass has been pressed into the proper form, the operator takes hold of arm J, which projects from the part B, and turns it to the right, thereby running the series of cams E up the inclined faces of the stationary cams D, whereby the part B, and moulded glass-ripener g will be elevated, as shown in red lines, fig. 2, the piston F, in the mean time, being raised in any proper manner, to permit of such elevation of the parts B and g.

By the above operation, the moulded-glass ripener g is loosened from the stem C, and raised before it becomes too much cooled, and contracted to the upper part thereof, which is made slightly tapering, or smaller than it is at the point where the glass encircles it when first pressed into form. The lower part, A, of the mould, may be fastened permanently to a bench or table, or it may be held by an arm, K, during the operation of raising the part B, as above explained.

With a mould constructed as above explained, my glass strawberry-ripener may be pressed and removed very expeditiously, and without liability of being broken.

Having described my improved mould for pressing and making glass strawberry-ripeners, what I claim therein as new, and desire to secure by Letters Patent, is—

1. The combination, with the base, A, stem C, and series of cams D, of the concaved and perforated part B, and series of cams E, substantially as and for the purposes set forth.

2. The combination, with the parts lettered A, B, C, D, and E, of the convex and recessed piston F, said parts being constructed and arranged for operation, substantially as and for the purposes set forth.

C. JILLSON.

Witnesses:
   THOS. H. DODGE,
   D. L. MILLER.